US010272337B2

United States Patent
Shimizu et al.

(10) Patent No.: US 10,272,337 B2
(45) Date of Patent: Apr. 30, 2019

(54) NON TRANSITORY COMPUTER-READABLE STORAGE MEDIUM AND METHOD OF CONTROLLING A COMPUTER

(71) Applicant: CAPCOM CO., LTD., Osaka (JP)

(72) Inventors: Akihiro Shimizu, Osaka (JP); Wataru Ikeda, Osaka (JP); Koshi Watamura, Osaka (JP); Teppei Yoneyama, Osaka (JP)

(73) Assignee: CAPCOM CO., LTD., Chuo-Ku, Osaka (JP)

( * ) Notice: Subject to any disclaimer, the term of this patent is extended or adjusted under 35 U.S.C. 154(b) by 141 days.

(21) Appl. No.: 15/440,301

(22) Filed: Feb. 23, 2017

(65) Prior Publication Data
US 2017/0239573 A1    Aug. 24, 2017

(30) Foreign Application Priority Data

Feb. 24, 2016  (JP) ................................. 2016-032747

(51) Int. Cl.
| | | |
|---|---|---|
| *A63F 13/25* | (2014.01) | |
| *A63F 13/57* | (2014.01) | |
| *G06T 13/80* | (2011.01) | |
| *G06T 13/60* | (2011.01) | |
| *G06T 15/04* | (2011.01) | |
| *G06T 15/20* | (2011.01) | |
| *A63F 13/525* | (2014.01) | |

(52) U.S. Cl.
CPC .............. *A63F 13/57* (2014.09); *A63F 13/25* (2014.09); *A63F 13/525* (2014.09); *G06T 13/60* (2013.01); *G06T 13/80* (2013.01); *G06T 15/04* (2013.01); *G06T 15/205* (2013.01)

(58) Field of Classification Search
CPC ...... G06T 13/40; G06T 13/60; G06T 2210/24
See application file for complete search history.

(56) References Cited

U.S. PATENT DOCUMENTS

| | | | |
|---|---|---|---|
| 9,147,283 B1* | 9/2015 | McVey | G06T 17/00 |
| 2004/0181382 A1* | 9/2004 | Hu | G06T 13/60 |
| | | | 703/9 |

(Continued)

OTHER PUBLICATIONS

Page entitled "Billboard" as presented on PolycountWiki, Last modified Feb. 14, 2015, and downloaded from http://wiki.polycount.com/wiki/Billboard on Aug. 23, 2018.*

(Continued)

*Primary Examiner* — David L Lewis
*Assistant Examiner* — Robert E Mosser
(74) *Attorney, Agent, or Firm* — IP Business Solutions, LLC (57) ABSTRACT

The present invention causes a computer to function as a virtual space generating unit, a game screen displaying unit and a fluid displaying unit.
A fluid displaying unit displays pseudo three-dimensional representation of fluid in virtual space on a game screen. And the fluid displaying includes a billboard setting unit and a two-dimensional simulation unit.
A billboard setting unit sets a billboard which has a plain object and which rotates around a predetermined center point in the plain object so that the plain object faces the virtual camera in the virtual space.
A two-dimensional simulation unit executes a two-dimensional simulation and displays a simulation result on the plain object.

8 Claims, 7 Drawing Sheets

(56) References Cited

U.S. PATENT DOCUMENTS

2008/0177519 A1* 7/2008 Miller .................... G06T 13/60
703/9
2009/0267951 A1* 10/2009 Chang .................... G06T 13/60
345/474

OTHER PUBLICATIONS

Page Enitiled 2.5D as presented on Wikipedia, last modified Jul. 24, 2018, and downloaded from https://en.wikipedia.org/wiki/2.5D on Aug. 23, 2018.*
Jonathan M. Cohen et al., "Interactive Fluid-Particle Simulation using Translating Eulerian Grids", Cohen interactive2010, (NVIDIA), [online] Jan. 4 2016, <http://jcohen.name/papers/Cohen_Interactive_2010.pdf>.
Keenan Crane et al., "Real-Time Simulation and Rendering of 3D Fluids", Chapter 30, CPU Gem 3, (Hubert Nguyen), [online] Jan. 4, 2016, <http://www.cs.columbia.edu/~keenan/Projects/GPUFluid/paper.pdf>.
Qing Yang, "Real-Time Simulation of 3D Smoke on GPU", Proceedings of the 3rd WSEAS Int. Conf. on Circuits, Systems, Signal and Telecommunications (CISST'09), pp. 130-134, [online] Jan. 4, 2016, <http://www.wseas.us/e-library/conferences/2009/ningbo/CD-CISST/CISST25.pdf>.

* cited by examiner

NON TRANSITORY COMPUTER-READABLE STORAGE MEDIUM AND METHOD OF CONTROLLING A COMPUTER

TECHNICAL FIELD

This invention relates to a non-transitory computer readable storage medium storing a game program and a controlling method of the game.

BACKGROUND OF THE INVENTION

Video games such as action games and role-playing games make characters act in a three-dimensional virtual game space corresponding to operation input by users. Various three-dimensional objects are located in the three-dimensional virtual game space and they are generated by computer graphics.

The way for describing a fluid is devised. For example, the three-dimensional fluid is shown by generating the computer graphics with a three-dimensional simulation of the fluid in the three-dimensional virtual space shown in Non-patent literature 1 to 3.

Non-patent literature 1: Jonathan M. Cohen, Sarah Tariq, Simon Green, "Interactive Fluid-Particle Simulation using Translating Eulerian Grids", Cohen interactive2010, (NVIDIA), [online] Jan. 4 2016, <http://jcohen.name/papers/Cohen_Interactive_2010.pdf>

Non-patent literature 2: Keenan Crane, Ignacio Llamas, Sarah Tariq, "Real-Time Simulation and Rendering of 3D Fluids", Chapter 30, CPU Gem 3, (Hubert Nguyen), [online] Jan. 4, 2016, <http://www.cs.columbia.edu/~keenan/Projects/GPUFluid/paper.pdf>

Non-patent literature 3: QING YANG, "Real-Time Simulation of 3 D Smoke on GPU", Proceedings of the 3rd WSEAS Int. Conf. on CIRCUITS, SYSTEMS, SIGNAL and TELECOMMUNICATIONS (CISST'09), pp. 130-134, [online] Jan. 4, 2016, <http://www.wseas.us/e-library/conferences/2009/ningbo/CD-CISST/CISST25.pdf>

SUMMARY OF THE INVENTION

Technical Problem

However, the three-dimensional simulation for showing the flow of the fluid causes increasing a processing load and slowing down the process during the game.

The present invention has an object to provide a storage medium and a controlling method of the game that can prevent increasing the processing load for showing the flow of the fluid on the surface of the three-dimensional objects, in a game with three-dimensional virtual space.

A game program according to the present invention includes a virtual space generating unit for generating a three-dimensional virtual space, a game screen displaying unit for displaying an image as a game screen taken by a virtual camera located in the virtual space and a fluid displaying unit for displaying pseudo three-dimensional representation of fluid in virtual space on the game screen. The fluid displaying unit includes a billboard setting unit for setting a billboard which has a plain object and which rotates around a predetermined center point in the plain object so that the plain object faces the virtual camera in the virtual space and a two-dimensional simulation unit for executing a two-dimensional simulation and displaying a simulation result on the plain object.

The two-dimensional simulation unit may execute the two-dimensional simulation with interference by a predetermined environmental element based on a positional relation between the plain object and the predetermined environmental element which changes its relative position around the billboard in the virtual space.

The two-dimensional simulation unit may set a predetermined fluid source in the virtual space and execute the two-dimensional simulation from a point at which the fluid source touches on the plain object of the billboard.

The billboard setting unit may set the multiple billboards for showing the fluid, and the multiple billboards may be located in the separate positions in a way in which at least two of center points of the billboard are shifted in the depth direction.

The game program may include a moving object control unit for controlling a moving object which can move in the virtual space and the billboard setting unit may cause the billboard to move in response to the movement of the moving object.

The fluid displaying unit may include a texture projection unit for projecting a texture of the fluid on the billboard, and the two-dimensional simulation unit may convert the texture based on the movement of the fluid by the two-dimensional simulation.

A method of controlling a computer according to the present invention includes a virtual space generating step for generating a three-dimensional virtual space, a game screen displaying step for displaying an image as a game screen taken by a virtual camera located in the virtual space and a fluid displaying step for displaying pseudo three-dimensional representation of fluid in virtual space on the game screen. The fluid displaying step includes a billboard setting step for setting a billboard which has a plain object and which rotates around a predetermined center point in the plain object so that the plain object faces the virtual camera in the virtual space and a two-dimensional simulation step for executing a two-dimensional simulation and displaying a simulation result on the plain object.

Advantages of the Invention

According to the present invention, a storage medium and a controlling method of the game that can prevent increasing the processing load for showing the flow of the fluid on the surface of the three-dimensional objects, in a game with three-dimensional virtual space, are provided.

SUMMARY OF THE GAME

The following is an example of an action game executed on a home game console device. The action game according to one embodiment generates a three-dimensional virtual game space. A user operates a player character acting in the virtual game space. The player character fights with enemy characters for the predetermined purpose such as killing off the enemy characters or arriving at a predetermined position in the virtual game space.

Hardware Configuration

The game device executing the game is described. The game system according to the one embodiment includes the game device 2 and external devices such as a monitor (display unit) 19, a speaker 22, and a controller (manipulation unit) 24 which are connected to the game device 2. The game system can execute the game based on a game program 30A and game data 30B loaded from a disk-typed storage medium 30. Hereinafter, the game system is simply described as the game device 2 in some cases.

Figure 1:
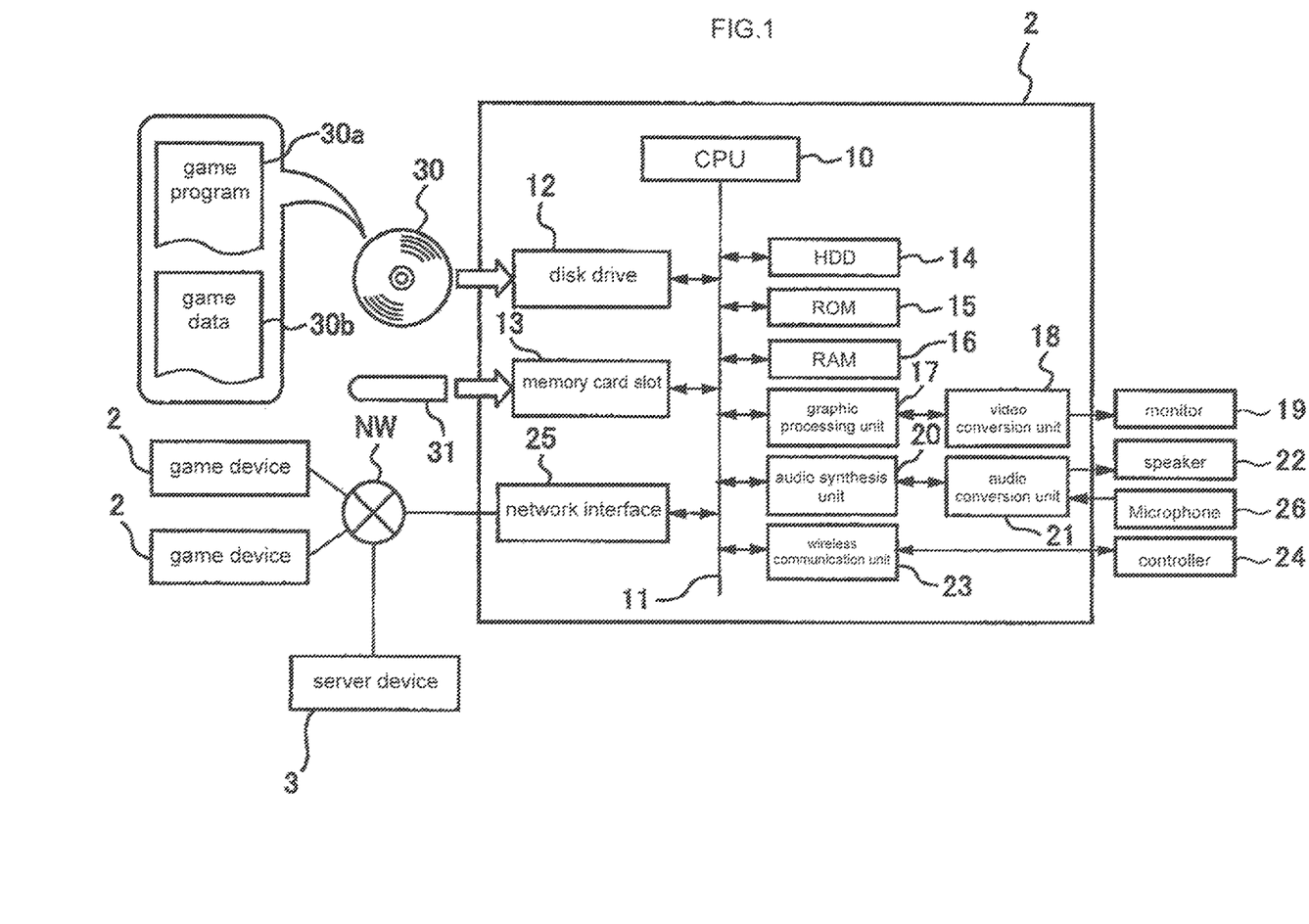
FIG. 1 is a block diagram showing a configuration of hardware in a game device according to one embodiment of the present invention.

FIG. 1 is a block diagram showing a configuration of hardware in the game device 2 according to one embodiment. As shown in FIG. 1, the game device 2 can communicate to other game devices 2 and a server 3 in both ways via a communication network NW such as the Internet or a local area network (LAN). The game device 2 has a central processing unit (CPU) 10 for controlling the game device 2. The CPU 10 is connected to a disk drive 12, a memory card slot 13, a hard disk drive (HDD) for storing a program, a read only memory (ROM) 15, and a random access memory (RAM) 16 via a bus 11.

Also, the CPU 10 is connected to a graphic processing unit 17, an audio composition unit 20, a wireless communication unit 23, and a network interface 25 via the bus 11.

The graphic processing unit 17 draws a game image including the virtual game space and characters in response to instructions from the CPU 10. The graphic processing unit 17 is connected to external monitor 19 via the video conversion unit 18. The game image drawn by the graphic processing unit 17 is converted to a video format, and the video is displayed on the monitor 19.

The audio synthesis unit 20 plays and synthesizes digital game sounds in response to instructions from the CPU 10. The audio synthesis unit 20 is connected to an external speaker 22 via an audio conversion unit 21. Therefore, the game sounds played and synthesized by the audio synthesis unit 20 are decoded to an analog format by the audio conversion unit 21, and are output to outside from the speaker 22.

The audio conversion unit 21 encodes user's voices input from a headset connected to the game device 2 or a microphone 26 embedded in the controller 24 into digital format data. The audio synthesis unit 20 can acquire the digital format data and can send acquired data to the CPU 10 as input data.

The wireless communication unit 23 has a 2.4 GHz band wireless communication module. The wireless communication unit 23 is connected to the controller 24 wirelessly, and can send and receive data. The user inputs signals into the game device 2 by manipulating control elements such as buttons on the controller 24 and can control an action of the player character displayed in the monitor 19. Also the network interface 25 connects the game device 2 to communication network NW such as the Internet or LAN. The game device can communicate with other game devices 2 or the server 3. The game device 2 is connected to other game devices 2 via the communication network NW. Each game device 2 sends and receives data. Each game device 2 can display multiple player characters in the same virtual game space in synchronization. Therefore a multiplay, in which multiple player characters corresponding to multiple users fight with enemy characters together or fight with other player characters, is executable.

(Functional Configuration of the Game Device)

Figure 2:
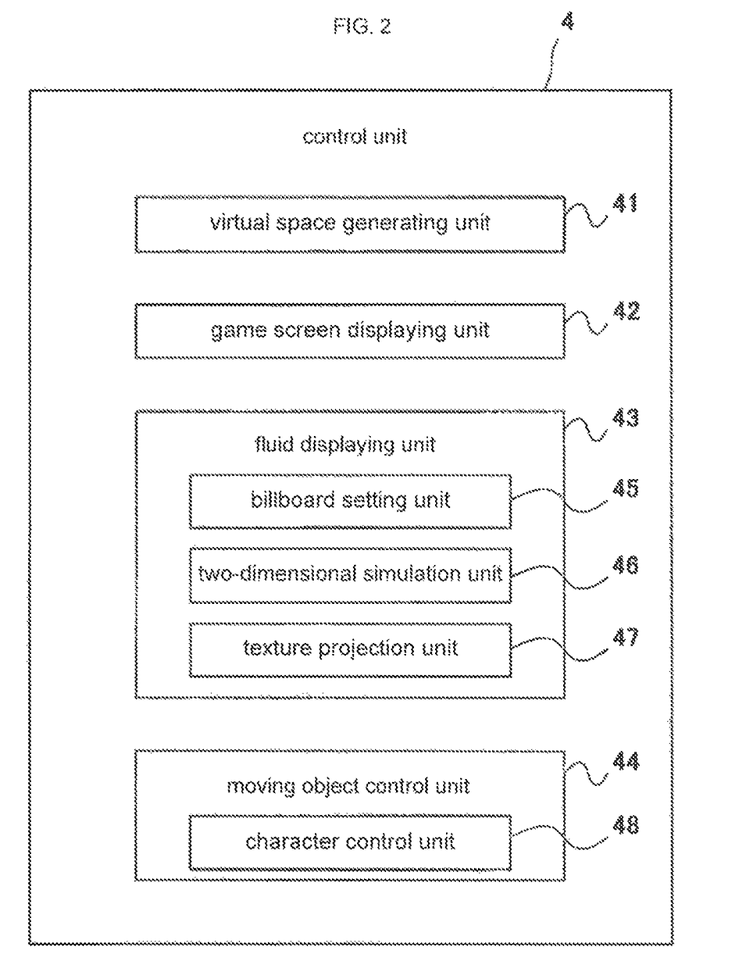
FIG. 2 is a block diagram showing a functional configuration of the game device shown in FIG. 1.

FIG. 2 is a block diagram showing a functional configuration of the game device shown in FIG. 1. The game device 2 operates as a computer including a control unit 4 including the CPU 10, the HDD 14, the ROM 15, the RAM 16, the graphic processing unit 17, the video conversion unit 18, the audio synthesis unit 20, the audio conversion unit 21, the network interface 25, and the like. As shown in FIG. 2, the control unit 4 of the game device 2 operates as a virtual space generating unit 41, a game screen displaying unit 42, a fluid displaying unit 43, and a moving object control unit 44 by executing the game program 30A. The fluid displaying unit 43 includes a billboard setting unit 45, a two-dimensional simulation unit 46, and a texture projection unit 47. The moving object control unit 44 includes a character control unit 48.

The virtual space generating unit 41 generates a third-dimensional virtual space. The virtual space is a game space in which the player character operated by the user acts. The virtual space generating unit 41 generates fixed objects located in the virtual space and/or moving objects such as the player character moving in the virtual space. For example, the virtual space generating unit 41 loads data about objects, textures, and so on included in game data 30B, and arranges them in the three-dimensional virtual space, in response to the moving player character.

Figure 3:
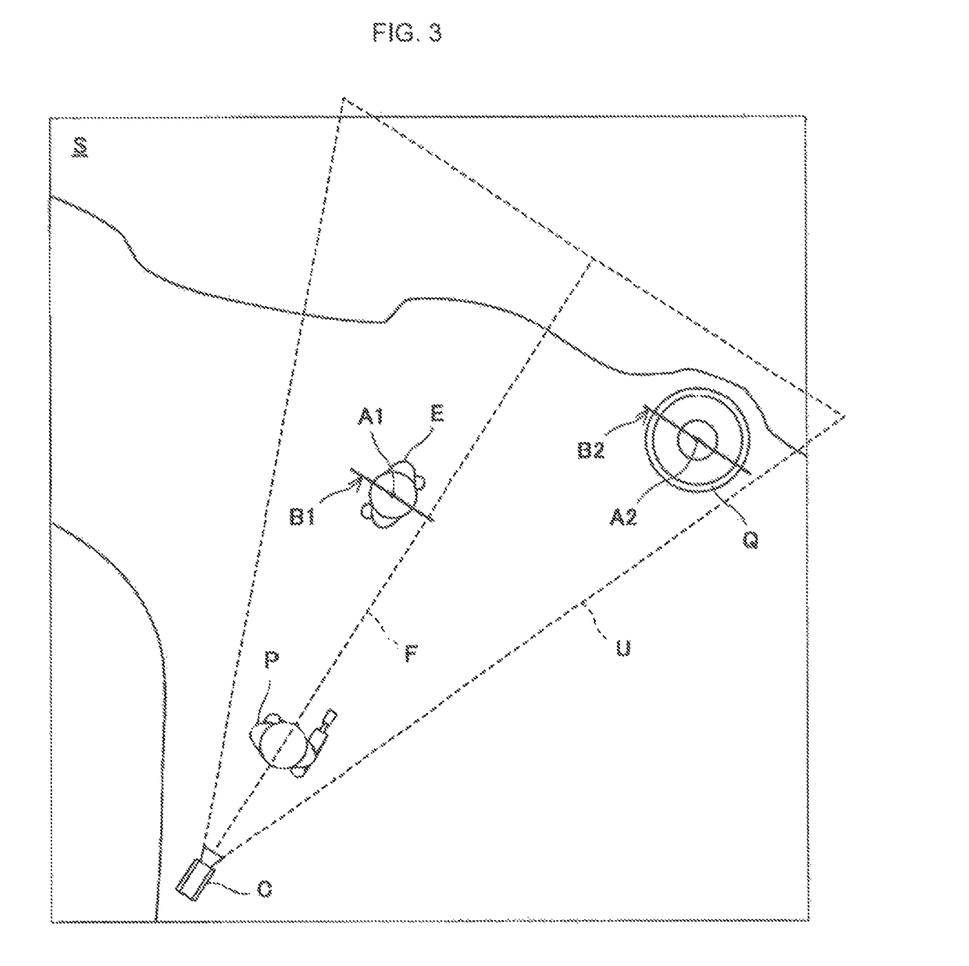
FIG. 3 is a plane view showing a three-dimensional virtual space according to one embodiment of the present invention.
Figure 4:
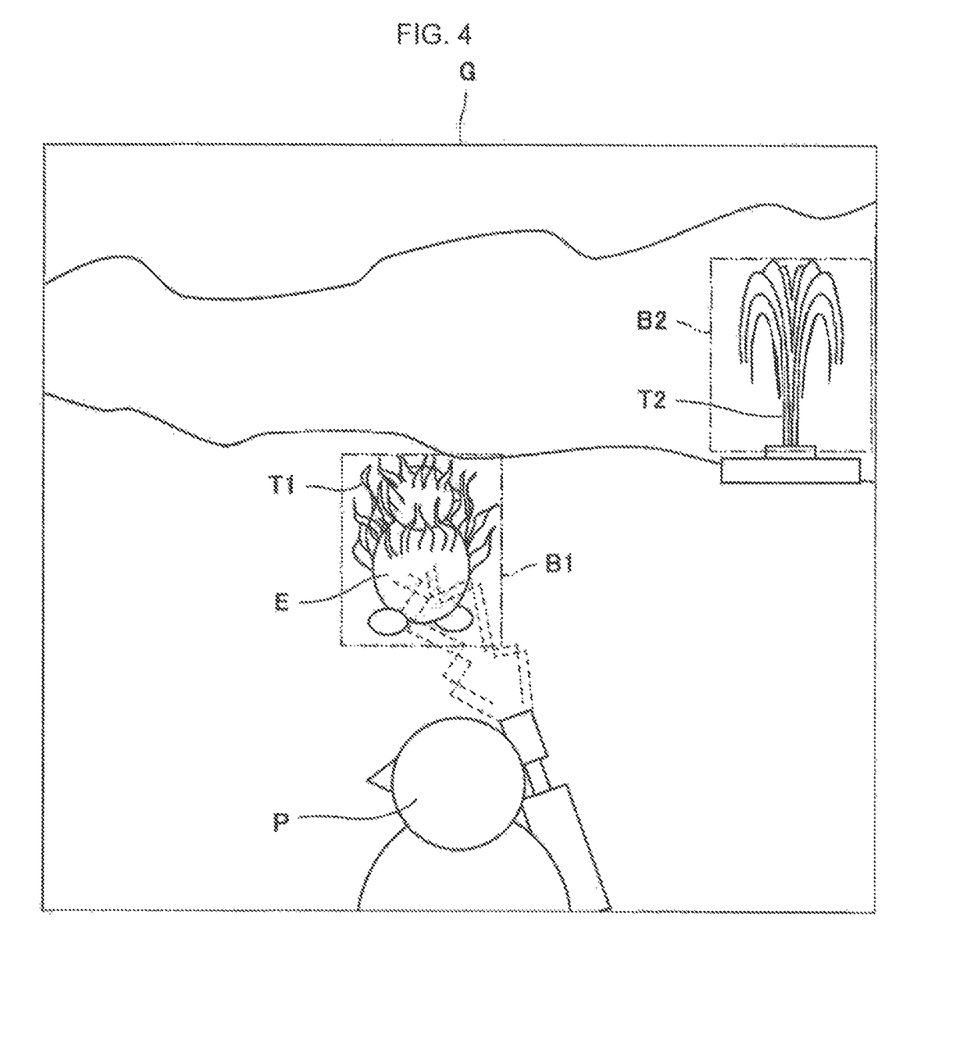
FIG. 4 is a view showing a game screen according to one embodiment of the present invention.

FIG. 3 is a plane view showing a three-dimensional virtual space in the present embodiment. FIG. 4 is a view showing a game screen in the present embodiment. As shown in FIG. 3, in the three-dimensional virtual space S, various objects and a virtual camera C are arranged on a landform drawn with polygons, textures, and so on. In the example of FIG. 3, a player character P operable by the user via the controller 24 and an enemy character E, which is a non-player object, are located in the virtual space S as the moving objects, and a fountain Q is located in the virtual space S as the fixed object.

The object control unit 44 controls actions of the moving objects P and E, which are movable in the virtual space. In particular, the object control unit 44 functions as the character control unit 48 which controls actions of the player character corresponding to the user who operates the computer in response to operation input to the controller 24 by the user or a progress status of the game. The moving objects include movable objects other than the player character P and the non-player object E. For example, the moving objects include vehicles such as cars and airplanes, flying objects such as balls, bombs, bullets and arrows, animals, and objects such as furniture that is spattered by burst. These moving objects are also controlled by the object control unit 44.

The game screen displaying unit 42 displays an image that is taken by the virtual camera C located in the virtual space S as a game screen G (FIG. 4) on the monitor 19. The moving objects P and E, the fixed object Q, and fluid T1 and T2 included in a shooting range U of the virtual camera C are displayed on the game screen G.

The fluid displaying unit 43 displays pseudo three-dimensional representation of the fluids T1 and T2 in virtual space S on the game screen G. According to one embodiment of the present invention, flame T1 clinging a non-player character E and a fountain T2 spouting from a fountain equipment Q are shown as examples in FIG. 4. The fluid T is not limited to this. For example, gas such as fire, smoke, and vapor, particle floating in the gas, or liquid such as water and blood may be applicable.

The billboard setting unit 45 locates billboards B1 and B2 in positions where the fluid T1 and T2 would be shown. The billboard B1 is located around the non-player character E and moves in response to the movement of the non-player character E. In other words, the billboard setting unit 45 locates the billboard B1 so that the billboard B1 moves with the non-player character E. Therefore, the center point A1 of the billboard B1 moves in response to the position of the non-player character E. The billboard B2 is located in the fountain equipment Q, which is a fixed object. In other words, the bill board B2 is fixed in the predetermined position in the virtual space S.

Figure 5:
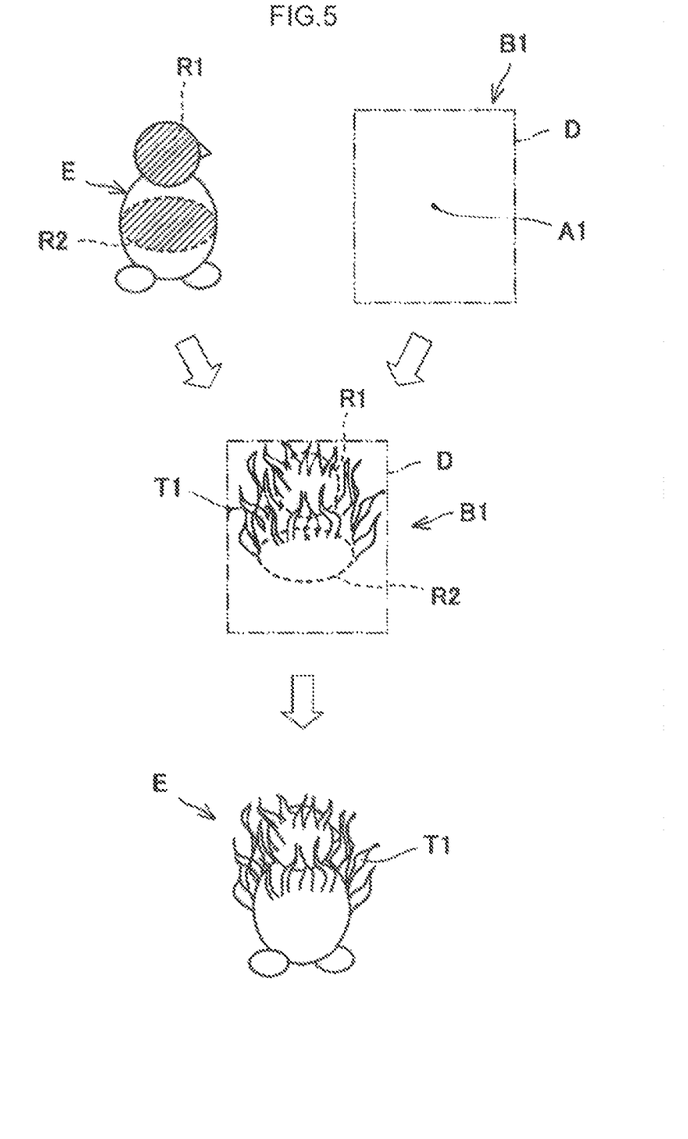
FIG. 5 is a view for explaining the method of the pseudo three-dimensional description of the fluid according to one embodiment of the present invention.

FIG. 5 is a view for explaining the method of the pseudo three-dimensional description of the fluid according to one embodiment of the present invention. In FIG. 5, the billboard B1 (flame T1) located in the non-player character E is shown as an example, similarly the billboard B2 (fountain T2) located in the fountain equipment Q is shown. The billboard B1 includes a plain object D and the center point A1 located in the plain object D, and rotates about the center point A1 so that the plain object D faces the virtual camera C. Therefore, the surface of the plain object D is orthogonal to a line segment F1 that is obtained by connecting the virtual camera C and the center point A1 even if the virtual camera C changes its position. Also the plain object D of the billboard B2 rotates about the center point A2 so that the plain object D faces the virtual camera C. The plain object D is not displayed on the game screen G. That is, the plain object E is transparent. However, it is specified for comprehension in FIG. 3 and FIG. 4

The rotation range of the billboard B1 about the center point A1 may be limited to a predetermined range. For example, the billboard B1 can rotate only about a vertical axis including the center point A and cannot rotate about a horizontal axis. In this case, the angle of the height direction (angle of elevation) of the virtual camera C is preferably fixed.

Characters or pictures are pasted on a plain object D of a common billboard. The billboard faces the position of the virtual camera C, so that same alphabets or images are displayed even if the virtual camera C is in any position in the virtual space S. As described below, the billboards B1 and B2 display a result of two-dimensional simulation of the fluid T1 executed on the plain object D instead of alphabets or images.

The two-dimensional simulation unit 46 executes the two-dimensional simulation of the fluid T1 and displays a result on the plain object D. In the two-dimensional simulation, a predetermined grid (simulation grid) is set on the plain object D of the billboard B1. For example, the simulation grid divides the plain object D in 64×64 parts. The two-dimensional simulation unit 46 simulates fluid (fire T1) with fluid sources R1 and R2 as the starting point on the plain object D in the part divided by the grid.

Two-dimensional simulation method is not limited to this, and well-known simulation methods are applicable. For example, methods described below may be used as the two-dimensional simulation.

"Real-Time Fluid Dynamics for Games", Jos Stam, <http://www.intpowertechcorp.com/GDC03.pdf>, "Fast FluidDynamics Simulation on the GPU", Mark J. Harris, Chapter 38. GPU Gems, <http://http.developer.nvidia.com/GPUGems/gpugems ch38.html>, "A Simple Fluid Solver based on the FFT", Jos Stam, <http://www.dgp.toronto.edu/people/stam/reality/Research/pdf/jgt01.pdf>, "Go With The Flow: Fluid and Particle Physics in PixelJunk Shooter", Jaymin Kessler, Game Developers Conference 2010, <http://fumufumu.q-games.com/gdc2010/shooterGDC.pdf>

The billboards B1 and B2 rotate so that the plain object D faces the virtual camera C when the virtual camera C has changed its position. Accordingly, the fluids T1 and T2 displayed on the plain object D of the billboards B1 and B2 may be shown pseudo three-dimensionally. Additionally, the fluids T1 and T2 shown pseudo three-dimensionally flow more realistically by executing two-dimensional simulation following a predetermined physical law on the plain object D against the fluids T1 and T2 which are two-dimensional objects. Therefore, by a combination of the billboards B1 and B2 which display two-dimensional object (fluids T1 and T2) three-dimensionally with the two-dimensional simulation, the fluid may be shown without increasing the processing load for showing the flow of the fluid. In other words, it is possible to prevent a decrease in process speed of displaying three-dimensional virtual space including fluid. Also, by setting a billboard to a moving object (non-player character E) like the billboard B1, the fluid T1 around the moving object may be shown in response to movement of the moving object.

The two-dimensional simulation is executed based on a predetermined simulation condition. For example, the simulation condition is set as one or more parameters based on characteristics of the fluid (a kind of gas, a kind of liquid, viscosity of fluid and the like), moving direction of fluid initial velocity, a direction of gravity and the like on a starting point. The two-dimensional simulation unit 46 executes the two-dimensional simulation based on a positional relation between the plain object D of the billboard B1 and a predetermined environmental element which changes its position around the billboard B1 in the virtual space S. In the simulation, the fluids T1 and T2 are interfered by the environmental element. For example, the environmental element may be a flow of fluid such as wind and rain or may be a predetermined object (like a character) which collides against the billboard B1. If the billboard B1 moves in the virtual space S, the environmental element may be wind pressure or water pressure which the billboard B1 receives while on the move.

A three-dimensional interference with the fluid by the environmental element around the billboard B1 is processed as flat interference on the billboard B1. The two-dimensional simulation with the flat interference by the environmental element projected on the billboard B1 is executed. Thereby, it is possible to reduce loads of simulation as compared with three-dimensional simulation with three-dimensional interference.

When the three-dimensional simulation is executed in the cube which has a 64×64×64 grid, to process the interference by environmental element, it is necessary to process not only flat interference but also the interference from the depth direction. On the other hand, in the case of the two-dimensional simulation in the plain object D (64×64), it is not necessary to process the interference from the depth direction. The number of parts of the grid does not just decreases (1/64), but it is not necessary to calculate a three-dimensional vector operation. Therefore, the two-dimensional simulation on the billboards B1 and B2 has very small loads as compared with the three-dimensional simulation.

In the present embodiment, the fluid sources R1 and R2 on the billboard B1 are set on the non-player character E. As shown in upper left figure in FIG. 5, the fluid source R1 is set to the head of the non-player character E, and the fluid source R2 is set to the belly of the non-player character E. The two-dimensional simulation unit 46 simulates the fluid (fire T1) on the plain object D, setting a part touching fluid sources R1 and R2 as the starting point on the plain object D when a predetermined fluid displaying condition has been met (see a middle figure in FIG. 5). The fluid T1 on the billboard B1 moves on the plain object D based on the two-dimensional simulation, and the fluid T1 looks like flowing. Since the billboard B1 is located on the non-player character E, the fire T1 is displayed around the non-player character E despite the direction of the non-player character E against the virtual camera C. As a result, it is possible to show a scene in which the non-player character E is covered by fire T1 (see a lower figure in FIG. 5).

The fluid source on the billboard B2 is, for example, set on the center of the fountain Q (fountain head). The fluid source may be set on an inner of a moving object or a fixed object as the above example, or may be set on an outside of a moving object or a fixed object. Also the fluid source may be set on a predetermined position on the plain objects of the billboards B1 and B2.

For example, in the present embodiment, the fluid displaying condition for the fire T1 on the plain object of the billboard B1 is that an attack (for example, fire radiation) by player character P hits the non-player character E. For example, the fluid displaying condition for the fountain T2 on the plain object of the billboard B2 is that the fountain equipment Q is in the photographing range of the virtual camera C or when a predetermined switch is operated by the player character P and the like. Also the fluid may be displayed at all times without the fluid displaying condition.

The fluids T1 and T2 displayed on the billboards B1 and B2 are shown by coloring the fluid themselves (such as dot). Alternatively the texture projection unit 47 may project the textures of the fluids T1 and T2 on the billboards B1 and B2 and the two-dimensional simulation unit 46 may convert the textures based on moving of the fluid by the two-dimensional simulation, so that the fluids T1 and T2 may be shown. Thereby, the fluids T1 and T2 may be shown realistically with details. Accordingly, a pseudo three-dimensional description becomes better.

In the case of projecting the texture, a resolution in the two-dimensional simulation may be lower than the resolution of the texture. For example, while the resolution in the simulation is 64×64 per one billboard, the texture is shown in 128×128 resolution (double resolution). The two-dimensional simulation unit makes double a result of the two-dimensional simulation executed in the 64×64 resolution by stretching in the vertical and horizontal directions for drawing texture in 128×128 resolution. And the two-dimensional simulation unit 46 converts the projected textures based on the result of the two-dimensional simulation. Thereby, it is possible to reduce loads of the two-dimensional simulation and to show the fluid realistically than the simulation of which resolution is the same size as the resolution of texture. A combination of the resolution of the two-dimensional simulation and the resolution of the texture may be set based on kinds of the fluids T1 and T2, an importance of displaying in the game, a resolution of an object around fluids T1 and T2 and the like. For example, while the resolution in the simulation is 64×64, the texture may be shown in 256×256 resolution (quadruple resolution).

Another Example 1

Figure 6:
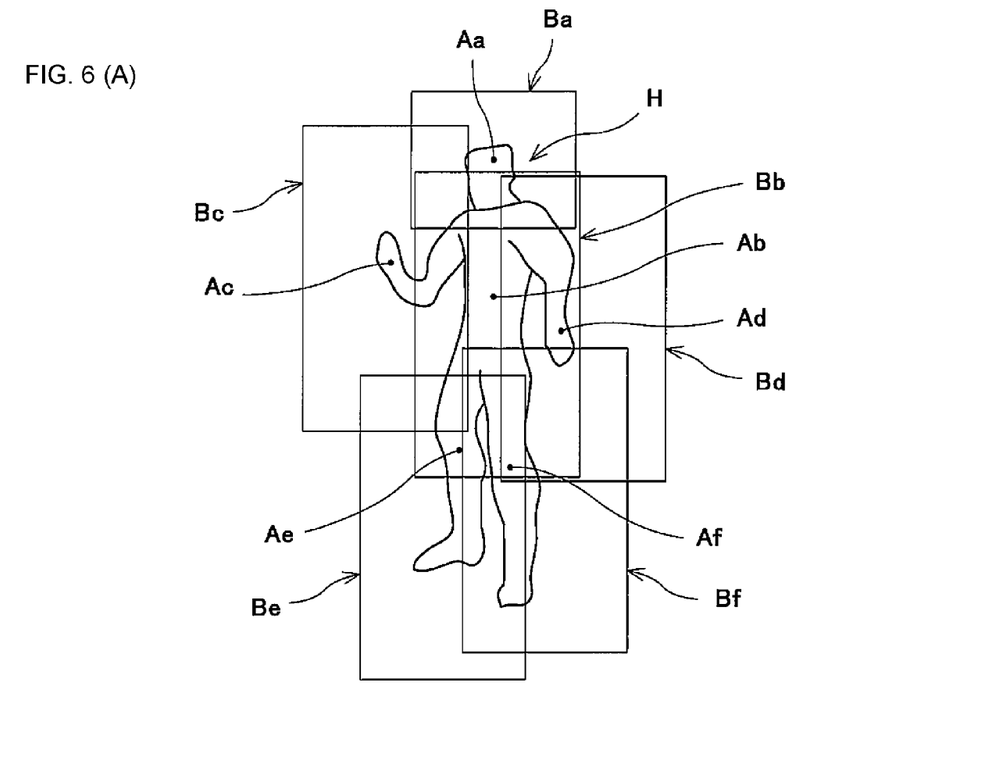
FIGS. 6A and 6B are views showing billboards placed in the character according to one embodiment of the present invention.

In the above example, the fluids T1 and T2 are shown by using the billboards B1 and B2; however, one fluid may be shown by using multiple billboards. FIGS. 6A and 6B are views showing billboards placed in the character according to another embodiment. FIG. 6A is a view from the virtual camera, and FIG. 6B is a view showing a character from above (plain view).

In this example, the billboard setting unit 45 locates multiple billboards Bi (i=a through f) for showing fluid (not shown in FIGS. 6A and 6B). At least two of the billboards Bi are located in the separate positions in order that at least two of center points Ai (i=a through f) of the billboards Bi are shifted in the depth direction (direction of central axis F of the virtual camera C). In this example, the center points Aa through Af of the billboards Ba through Bf are located in the head, the torso, the right hand, the left hand, the right knee, and the left knee of the character H. When the virtual camera C shoots the character H from anywhere, at least two of the center points Ai of the billboards Bi are shifted in the depth direction.

By using the multiple billboards Bi of which center points Ai are shifted in the depth direction, the pseudo three-dimensional description of the fluid can have a thickness in the depth direction, and the fluid can be shown more sterically. For example, as shown in FIG. 6A and FIG. 6B, when the multiple billboards Bi are set to the character H, the fluid may be shown in the whole body of the character H. In this case, wherever the character H is located against the virtual camera C, the number of the billboards Bi touching the character H is not less than three. Thereby, when the virtual camera C shoots the character H from anywhere, the pseudo three-dimensional description of the fluid can be shown with a less feeling of strangeness.

For example, the fluid source is set on the surface of the whole body of the character H in the present embodiment. In this case, the two-dimensional simulation unit 46 simulates the fluid (such as fire T1 in FIG. 3 through 5) on the plain object D with fluid source which is the part divided by the grid on the plain object D of the billboard Bi touching the character H, as the starting point, when a predetermined fluid displaying condition has been met. Alternatively the fluid sources may be set on the parts of the surface of the character H touched by the billboards Bi. In the case of using the multiple billboards Bi, the fluid source is located in the position where the fluid source touches the billboard Bi when each of the billboards Bi has leaned to a specific pose.

The two-dimensional simulation unit 46 may switch to display and to hide the fluid on the part of the billboards Bi (or, to execute and to stop the two-dimensional simulation) depending on the distance from the virtual camera C. When the billboards Bi are set to the object such as the character H, the two-dimensional simulation unit 46 may switch to display and to hide the fluid on the part of the billboards Bi (or, to execute and to stop the two-dimensional simulation) depending on the direction of the object against the virtual camera C.

Another Example 2

Figure 7:
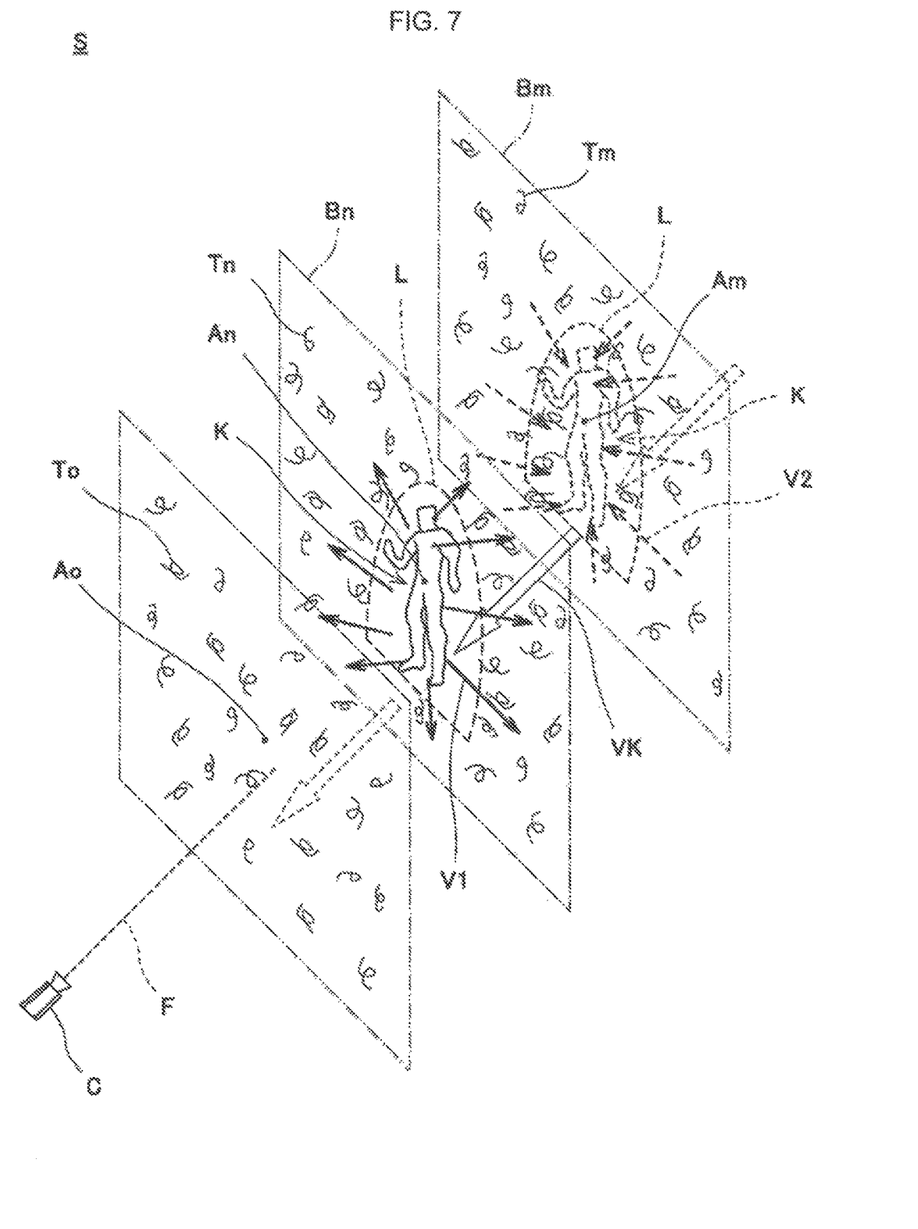
FIG. 7 is a view showing billboards placed in the virtual space according to one embodiment of the present invention.

In the above example, the billboards B1 and B2 are set to the fixed object or the moving object and the fluid related to the object is shown. Also the fluid may be shown as an environment element in the virtual space S. FIG. 7 is a view showing billboards placed in the virtual space according to another embodiment. In the example of FIG. 7, three billboards Bj (j=m, n, o) of which center points Aj (j=m, n, o) are fixed are placed in a predetermined positions in the virtual space S. In this case, a character K, which is a moving object, is moving parallel to a line F which is connected to the virtual camera C and the center point Aj of the billboard Bj (moving to VK direction in FIG. 7). Also the character K may be moving parallel to a line intersecting the line F (direction having a predetermined angle). The fluid (for example smoke) Sj (j=m, n, o) are shown on the each of billboards Bj based on an independent two-dimensional simulation. When the billboard Bo is not passed by the character K, the fluid To is shown on the billboard Bo.

When the character has touched (passed through) such billboard Bj, as shown in billboard Bn in FIG. 7, the fluid Tn displayed on the billboard Bn is shown as if the fluid T spread around character K. A collision detection area L is set around the character K. The fluid Tn inside the border of the collision detection area L which has touched the billboard Bn receives outward power V1. This outward power V1 is added to the parameter of the two-dimensional simulation for the fluid Tn on the billboard Bn, and the fluid Tn is affected by the outward power V1. As a result, the fluid Tn inside the border of the collision detection area L on the billboard Bn which the character K has touched becomes thin.

After the character K passed, when the collision detection area L has not touched billboard Bm, the fluid Tm outside (around) the border of the collision detection area L which touched the billboard Bm receives inward power V2. This inward power V2 is added to the parameter of the two-dimensional simulation for the fluid Tm on the billboard Bm, and the fluid Tm is affected by the inward power V2. As a result, the fluid Tm is shown as if the fluid Tm flows to the area in which the fluid Tm becomes thin by passing of the character K (the area inside the border of the collision detection area L). In the process described above, it is possible to show the smoke around the character K which is affected by the moving character K when the character K goes in the smoke (the fluid Tj).

Preferably, the collision detection area L which is located around the character K is located outside the border of the character K. Thereby, the fluid can be shown more realistically.

Another Example

The present invention may be improved, changed, and modified without departing from the broader idea and scope of the invention and not intended to be limited to the particular embodiments (forms) disclosed above.

For example, one billboard is separated from other billboards in the virtual space S; however, the present invention is not limited to this. For example, multiple billboards may be connected to each other. Generally, this is called a ribbon, and an edge of one billboard located in the virtual space S is connected to another billboard (or multiple billboards). This is useful to show a billowing smoke (smoke signal) and the like.

Also the billboard may move independently from the object located in the virtual space S within a predetermined range in the virtual spaces S. This is useful to show a flowing smoke over a wide range and the like.

The two-dimensional simulation unit 46 may switch to display and to hide the fluid on the billboards (or, to execute and to stop the two-dimensional simulation) depending on the distance from the virtual camera C. In this case, the two-dimensional simulation unit 46 hides the fluid on the billboard or stops the two-dimensional simulation if the distance between the virtual camera C and the billboard is longer than a predetermined distance. If the fluid on the billboard is not seen very well on the game screen, the two-dimensional simulation unit 46 hides the fluid. Thereby, it is possible to reduce loads. Preferably, switching to display and to hide the fluid on the billboards (or, to execute and to stop the two-dimensional simulation) is performed in a step-by-step manner.

Also, when the billboard is set to the object, the two-dimensional simulation unit 46 may switch to display and to hide the fluid on the billboards (or, to execute and to stop the two-dimensional simulation) depending on the direction of the object against the virtual camera C. When the billboard is set to the moving object and the moving object has been hidden by a shielding object (fixed object), the two-dimensional simulation unit 46 may change the two-dimensional simulation (for example slow simulation speed).

In the above embodiment, the virtual camera C is located behind the player character P and moves with the character P. However, the virtual camera C may move independently of the player character P, or the virtual camera C may be located fixedly in a predetermined position. When the virtual camera C may be located fixedly, especially, when the multiple virtual cameras C shoot the same object from different angles, the fluid may be preferably shown on the object by the above process.

When the multiple billboards are used for the fluid, the two-dimensional simulation unit 46 may limit the number of the billboards displaying the fluid (the number of the billboards executing two-dimensional simulation) to a predetermined number (upper limit). Thereby, the fluid can be shown enough with prevention of increasing the processing loads.

According to the above embodiment, an example of an action game is described; however, the present invention is applicable to various games using three-dimensional virtual space such as a role playing game, a simulation game and a shooting game.

The above embodiment is disclosed in the form of such stationary game consoles. However, the present invention can be applied to mobile game consoles, mobile phones, personal computers, etc.

INDUSTRIAL APPLICABILITY

The present invention is applicable to a game program and a controlling method of the game that has the three-dimensional virtual space, and is prevented from increasing processing load for showing richly the flow of the fluid on the surface of the three-dimensional objects.

REFERENCE SIGNS LIST 2 game device
30A game program
30B game data
41 virtual space generating unit
42 game screen displaying unit
43 fluid displaying unit
44 moving object control unit
45 billboard setting unit
46 two-dimensional simulation unit
47 texture projection unit 48 character control unit
A1, A2, Aa-Af, Am-Ao center points
B1, B2, Ba-Bf, Bm-Bo billboards
C virtual camera
D plain object
S virtual space
T1, T2, Tm-To fluids
E, P, H, K characters (moving objects)
Q fixed object

The invention claimed is:

1. A non-transitory computer-readable storage medium storing a program for driving a computer to function as:
 a virtual space generating unit for generating a three-dimensional virtual space;
 a game screen displaying unit for displaying an image as a game screen taken by a virtual camera located in the virtual space; and
 a fluid displaying unit for displaying pseudo three-dimensional representation of fluid in virtual space on the game screen;
 wherein the fluid displaying unit includes
  a billboard setting unit for setting a billboard which has a plain shape and which rotates around a predetermined center point thereof to face the virtual camera in the virtual space, and
  a two-dimensional simulation unit for executing a two-dimensional simulation and displaying a simulation result on the billboard,
 wherein the two-dimensional simulation unit sets a fluid source in the virtual space, on which the billboard is arranged, and executes the two-dimensional simulation from a point at which the fluid source is in contact with the billboard.

2. The non-transitory computer-readable storage medium according to claim 1,
 wherein the two-dimensional simulation unit executes the two-dimensional simulation with interference by a predetermined environmental element based on a positional relation between the plain object and the predetermined environmental element which changes its relative position around the billboard in the virtual space.

3. The non-transitory computer-readable storage medium according to claim 1,
 wherein the two-dimensional simulation unit sets a predetermined fluid source in the virtual space and executes the two-dimensional simulation from a point in which the fluid source touches on the plain object of the billboard.

4. The non-transitory computer-readable storage medium according to claim 1,
 wherein the billboard setting unit sets the multiple billboards for showing the fluid,
 wherein the multiple billboards are located in the separate positions in order that at least two of center points of the billboard are shifted in the depth direction.

5. The non-transitory computer-readable storage medium according to claim 1 storing a program for driving a computer to function as:
 a moving object control unit for controlling a moving object which can move in the virtual space;
  wherein the billboard setting unit cause the billboard to move in response to movement of the moving object.

6. The non-transitory computer-readable storage medium according to claim 1,
 wherein the fluid displaying unit includes a texture projection unit for projecting a texture of the fluid on the billboard,
 wherein the two-dimensional simulation unit converts the texture based on moving of the fluid by the two-dimensional simulation.

7. The non-transitory computer-readable storage medium according to claim 1,
 wherein the fluid source is a game character.

8. A method of controlling a computer comprising:
 a virtual space generating step for generating a three-dimensional virtual space;
 a game screen displaying step for displaying an image as a game screen taken by a virtual camera located in the virtual space; and
 a fluid displaying step for displaying pseudo three-dimensional representation of fluid in virtual space on the game screen;
 wherein the fluid displaying step includes
  a billboard setting step for setting a billboard which has a plain shape and which rotates around a predetermined center point thereof to face the virtual camera in the virtual space; and
  a two-dimensional simulation step for executing a two-dimensional simulation and displaying a simulation result on the plain object
 wherein the two-dimensional simulation step includes a step for setting a fluid source in the virtual space, on which the billboard is arranged, and a step for executing the two-dimensional simulation from a point at which the fluid source is in contact with the billboard.

* * * * *